(12) United States Patent
Pashintsev et al.

(10) Patent No.: US 9,674,396 B1
(45) Date of Patent: Jun. 6, 2017

(54) MATRIX CAPTURE OF LARGE SCANNED DOCUMENTS

(71) Applicant: Evernote Corporation, Redwood City, CA (US)

(72) Inventors: Alexander Pashintsev, Cupertino, CA (US); Boris Gorbatov, Sunnyvale, CA (US); Leonid Kitainik, San Jose, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 0 days.

(21) Appl. No.: 14/967,462

(22) Filed: Dec. 14, 2015

Related U.S. Application Data

(60) Provisional application No. 62/093,025, filed on Dec. 17, 2014.

(51) Int. Cl.
*H04N 1/04* (2006.01)
*H04N 1/387* (2006.01)
*H04N 1/00* (2006.01)

(52) U.S. Cl.
CPC ....... *H04N 1/3876* (2013.01); *H04N 1/00442* (2013.01); *H04N 1/04* (2013.01); *H04N 1/0443* (2013.01); *H04N 2201/0084* (2013.01)

(58) Field of Classification Search
CPC .................................................. H04N 1/3876
See application file for complete search history.

(56) References Cited

U.S. PATENT DOCUMENTS

| 6,903,762 | B2* | 6/2005 | Prabhu | G06F 8/60 348/207.1 |
|---|---|---|---|---|
| 6,975,352 | B2* | 12/2005 | Seeger | H04N 5/232 348/218.1 |
| 8,699,819 | B1* | 4/2014 | Ziegler | G06K 9/6201 358/497 |
| 9,479,357 | B1* | 10/2016 | Fu | H04W 12/12 |
| 2013/0031471 | A1* | 1/2013 | Xu | G06T 11/00 715/251 |
| 2014/0168721 | A1* | 6/2014 | Ichihashi | H04N 1/00477 358/474 |
| 2014/0270372 | A1* | 9/2014 | Na | G06K 9/00335 382/103 |
| 2015/0063653 | A1* | 3/2015 | Madhani | G06K 9/036 382/112 |

* cited by examiner

*Primary Examiner* — Ibrahim Siddo
(74) *Attorney, Agent, or Firm* — Morgan, Lewis & Bockius LLP

(57) ABSTRACT

Enhancing image quality of an initial full image of a document includes subdividing the initial full image of the document into a number of segments, directing a user to take photographs with a smartphone to provide a separate segment image for each of the segments by presenting on a screen of the smartphone a view of the document having lines superimposed thereon corresponding to the segments, and merging the separate segment images to provide an enhanced full image. The number of segments may depend upon a size of text in the initial full image and a desired height of text in the enhanced full image. The initial full image may be provided by a photograph taken by the user with the smartphone. The view of the document having lines superimposed thereon corresponding to the segments may provide a target to the user for photographing the segments.

32 Claims, 4 Drawing Sheets

MATRIX CAPTURE OF LARGE SCANNED DOCUMENTS

CROSS-REFERENCE TO RELATED APPLICATIONS

This application claims priority to U.S. Prov. App. No. 62/093,025, filed on Dec. 17, 2014, and entitled "MATRIX CAPTURE OF LARGE SCANNED DOCUMENTS", which is incorporated herein by reference.

TECHNICAL FIELD

This application is directed to the field of capturing, analyzing and managing information and a graphical user interface, and more particularly to the field of capturing, analyzing and managing information and a graphical user interface in connection with obtaining and processing photographic images of documents.

BACKGROUND OF THE INVENTION

Mobile phones with digital cameras are dominating worldwide phone shipments. Total 2014 sales of phone cameras to mobile phone manufacturers for embedding into smartphones and feature phones slightly exceeded 1.5 billion units. According to market statistics and forecasts, by 2018, annual smartphone shipments are expected to grow to 1.87 billion units; around 83% of all phones will be arriving to owners with embedded digital cameras. These shipments will expand the current audience of approximately 6.7 billion mobile subscribers and 4.3 billion unique mobile phone users and will update mobile phones currently used by the subscribers.

Volumes of photographs taken with phone cameras are also growing rapidly. According to Pew Research, photographing with phone cameras is the single most popular activity of smartphone owners and is utilized by 82% of users, compared with 80% for the second most popular activity, texting. Recent studies show that about 27% of all photos have been taken with smartphones. Volumes of photographic images taken with smartphones and posted on social photo sharing sites have already exceeded the cumulative size of photographs taken with any other equipment.

Hundreds of millions of smartphone users are combining their everyday digital lifestyles with paper habits in their business offices and homes. Paper documents continue to play a significant role in the everyday information flow of individuals, households, and especially business users. The role of digitizing and capturing paper based information has increased with the arrival of unified multi-platform content management systems capable of capturing, storing, displaying and modifying information across all user devices, such as the Evernote service and software developed by Evernote Corporation of Redwood City, Calif. Many types of paper documents benefit from being captured digitally and being made available in electronic document formats. These documents include pages from books and magazines, printed newspaper articles, receipts, invoices, checks, tax and other forms, printed reports, business cards, handwritten notes and memos on legal pads, specialized Moleskine® notebooks or on sticky notes or easels, and many other types of printed and handwritten documents.

Modern scanners offer solutions for some of the growing information capturing needs. Thus, unit volumes of mobile scanners are expected to grow from approximately one million to two million in the next five years. However, the mobile lifestyle of workforce and consumers often requires capturing documents or portions thereof under random conditions where users may not have access to an office or home scanner. Additionally, compact document scanners, as well as regular flatbed scanners, may not be able, to provide quality capturing of some types of documents, such as book or magazine pages.

The aforementioned market requirements and usage restrictions are increasingly stimulating a development of smartphone based document capturing solutions, such as remote check deposit software integrated with online banking systems, the Scannable software application for iPhone and iPad by Evernote or by Mobile Capture Solutions for Life by ABBYY Software Ltd. A new breed of document capturing applications includes advanced algorithms for lighting, color and shape corrections, page border detection, contrast optimization, noise removal and other features aimed at creating optimized images of photographed documents nearing scan quality.

Notwithstanding a significant progress in building phone camera scanning applications, this category of document capturing software still faces significant challenges; one of the most important tasks is reproducing legible text and drawings when photographing larger document pages or whiteboards when a single photo from distance conflicts with the camera resolution and leaves text size and other page elements too small and illegible for a user.

Accordingly, it is desirable to be able to provide document capturing with phone cameras that improves legibility of captured text and drawings and possesses an intuitive user interface.

SUMMARY OF THE INVENTION

According to the system described herein, enhancing image quality of an initial full image of a document includes subdividing the initial full image of the document into a number of segments, directing a user to take photographs with a smartphone to provide a separate segment image for each of the segments by presenting on a screen of the smartphone a view of the document having lines superimposed thereon corresponding to the segments, and merging the separate segment images to provide an enhanced full image. The number of segments may depend upon a size of text in the initial full image and a desired height of text in the enhanced full image. The document may be a page from a book, a page from a magazine, a printed newspaper article, a receipt, an invoice, a check, a tax form or other form, a printed report, one or more business cards, a handwritten note, a memo on a legal pad, a page from a specialized Moleskine® notebook, a specialized Moleskine® sticky note, or an easel. The initial full image may be provided by a photograph taken by the user with the smartphone. The view of the document having lines superimposed thereon corresponding to the segments may provide a target to the user for photographing the segments. In response to the user successfully photographing a particular segment, a visual indicator may be provided on the particular segment in the view of the document having lines superimposed thereon corresponding to the segments. Instructions for photographing non-captured segments may be provided to the user on the screen of the smartphone. The instructions may include an arrow indicating a recommended next one of the segments to photograph and a recommended navigation path across non-captured segments. In response to a user photographing a particular segment that is not the recommended next one of the segments, the navigation path may be adjusted. In response to a user photographing a particular segment that is not the recommended next one of the segments, the user may be provided with an option to delete the segment image corresponding to the particular segment. In response to a user photographing a particular segment that is not the recommended next one of the segments, the user may be provided with an option to indicate that the corresponding segment image is for a different segment in the view of the document having lines superimposed thereon corresponding to the segments. The smartphone may automatically detects which of the segments has been photographed by the user. A captured image may be automatically deleted in response to a quality of the image being relatively low. A user may be provided with an option to delete an image in response to obstructions being detected in the image. The smartphone may includes software that is pre-loaded with the smartphone, software that is installed from an app store, software that is installed from a desktop, software that is installed from media, and/or software that is downloaded from a Web site. The smartphone may use an operating system selected from the group consisting of: iOS, Android OS, Windows Phone OS, Blackberry OS and mobile versions of Linux OS.

According further to the system described herein, a non-transitory computer-readable medium contains software that enhances image quality of an initial full image of a document. The software includes executable code that subdivides the initial full image of the document into a number of segments, executable code that directs a user to take photographs with a smartphone to provide a separate segment image for each of the segments by presenting on a screen of the smartphone a view of the document having lines superimposed thereon corresponding to the segments, and executable code that merges the separate segment images to provide an enhanced full image. The number of segments may depend upon a size of text in the initial full image and a desired height of text in the enhanced full image. The document may be a page from a book, a page from a magazine, a printed newspaper article, a receipt, an invoice, a check, a tax form or other form, a printed report, one or more business cards, a handwritten note, a memo on a legal pad, a page from a specialized Moleskine® notebook, a specialized Moleskine® sticky note, or an easel. The initial full image may be provided by a photograph taken by the user with the smartphone. The view of the document having lines superimposed thereon corresponding to the segments may provide a target to the user for photographing the segments. In response to the user successfully photographing a particular segment, a visual indicator may be provided on the particular segment in the view of the document having lines superimposed thereon corresponding to the segments. Instructions for photographing non-captured segments may be provided to the user on the screen of the smartphone. The instructions may include an arrow indicating a recommended next one of the segments to photograph and a recommended navigation path across non-captured segments. In response to a user photographing a particular segment that is not the recommended next one of the segments, the navigation path may be adjusted. In response to a user photographing a particular segment that is not the recommended next one of the segments, the user may be provided with an option to delete the segment image corresponding to the particular segment. In response to a user photographing a particular segment that is not the recommended next one of the segments, the user may be provided with an option to indicate that the corresponding segment image is for a different segment in the view of the document having lines superimposed thereon corresponding to the segments. The smartphone may automatically detects which of the segments has been photographed by the user. A captured image may be automatically deleted in response to a quality of the image being relatively low. A user may be provided with an option to delete an image in response to obstructions being detected in the image. The smartphone may includes software that is pre-loaded with the smartphone, software that is installed from an app store, software that is installed from a desktop, software that is installed from media, and/or software that is downloaded from a Web site. The smartphone may use an operating system selected from the group consisting of: iOS, Android OS, Windows Phone OS, Blackberry OS and mobile versions of Linux OS.

The proposed system offers a matrix style capture of large documents with a phone camera, whereby portions of a document page are each captured from a closer distance; the system builds the capturing matrix based on a preliminary full-page photograph made by a user. The system keeps track of captured page fragments, directs the user through an optimal capturing sequence, making sure that no parts of the page are omitted, and merges captured fragments into a single page image after a matrix capture session is completed, eliminating overlaps between the fragments.

When a user is tasked with taking a quality photograph of a large format document page, an easel, a whiteboard or other media with a camera phone, the system may advise the user to start capturing by taking a single photograph from a sufficient distance for the whole document to fit a single image. The system may then detect page borders, retrieve the page, correct the document geometrically, including perspective correction, dewarping and other mechanisms. Subsequently, the system may retrieve page or other content and split the content into text lines, paragraphs and drawings. Based on the retrieved information, the system may estimate the size of text as viewed by the user on the photographed image using known algorithms.

If a significant amount of text detected on the new image has a smaller size (for example, by letter height) than a predefined size or a size suggested by the user for readability threshold, the system may recommend re-capturing a page image via a matrix capture method where multiple close-up photos of page fragments may be taken. The system may design the matrix based on a magnifying factor which may be calculated, for example, as a ratio of a minimal predefined size of legible text (which may depend on camera parameters) to an actual size of text retrieved from the above full page image. Thus, for example, if the ratio is 3.5, the system may use the 4× magnification; accordingly, the system may recommend capturing of four images corresponding to quadrants of the page. In this case, the system may be building a 2×2 capturing matrix; in another example, where the magnifying factor is 5.7, the system may use a 6× magnification and design a 2×3 matrix arranged on the page in such way that the fragments (cells) of the matrix are closer to squares.

The system may display the matrix on top of the original full page image and may display instructions to the user requesting capture of each fragment via a separate shot. When the user moves the camera closer to the document to take a photo of a fragment, the visualized matrix may serve as a target grid to assist the user in focusing the camera in order to capture each cell in such manner that the gridlines and page borders (for corner or side cells of the page) are as close to the outer boundaries of the camera preview window as possible, optimally fitting the cell into the camera shot. Alternatively, the system may display the capturing matrix once, without showing it in the view window, and may further direct the user to capture fragments of the page according to the matrix.

As fragments of the page are photographed by the user, the system may keep track of the captured area and may dynamically merge the captured images of page fragments into an enlarged image of the page. The system may refrain from displaying the partially filled enlarged image to the user in order to avoid holding up the capturing process.

After capturing a new fragment is completed, the system may display to the user the status of the matrix capturing process by displaying the matrix with the following clues:
  (i) checked out or otherwise marked fragments (cells of the matrix) that have already been captured; and
  (ii) instructions on capturing the rest of the fragments.

As an example of a matrix capturing instruction, a fragment recommended for immediate capturing may be pointed to by a bold arrow starting at a just completed fragment or may otherwise be highlighted, while the rest of the trajectory across the matrix to take photos of yet uncaptured fragments may be shown by dashed or color coded arrows or lines. If a user deviates from instructions while navigating through the capturing matrix, the system may recalculate the trajectory and display an updated set of instructions.

Some of the sequentially captured fragments may have detectable defects, such as obstruction by alien objects, wrong view angles, significant deviations from the prescribed capturing distance (which may distort the size of the captured fragment compared to a desired size), sudden changes in lighting conditions, causing glare and reflections, etc. When captured fragments have detectable defects, the system may reject a photograph and display to the user additional instructions and a request to re-capture the fragment.

A user may occasionally capture a wrong fragment (cell) of the capturing matrix instead of a fragment suggested by the system. If an image of a newly captured fragment otherwise has a sufficient quality (as opposed to having relatively low quality, which was discussed in the previous paragraph), the system may utilize different automatic, semi-automatic and manual techniques to fix such capturing errors and recalculate instructions provided to the user. Some of these techniques are presented below. These techniques rely on the presence of a starting full-page (full-surface, full-object) photograph, as explained elsewhere herein). The full-page photograph is used by the system to build the matrix capturing grid; therefore, the system starts with low quality images of each fragment. The initial low resolution fragments may be used for identifying a newly captured fragment; the system may scale down the new fragment and map the new fragment on the low resolution fragment images defined by the matrix grid, attempting to identify the latest fragment captured by the user. There can be several possible outcomes of such identification attempt:

1. Correct fragment. In case the system has reliably identified that the newly captured fragment as a fragment suggested by the system, the fragment may be checked out from the matrix and the system may continue with the next step of its instructions to invite the user to capture a next fragment or to finalize the matrix capturing session if no more uncaptured fragments are left.
2. Double capturing. If the fragment has been already captured, the system may ignore the latest captured fragment (because the system already has a quality image of the fragment, as explained elsewhere herein), notify the user that the fragment has been double-captured and may reiterate the unchanged existing instruction on the next fragment recommended for capturing. In some cases, the system may compare quality of the two fragments and discard the fragment of lower quality.
3. Wrong fragment identified. If the identified fragment has been identified by the system on the capturing matrix and has not been previously captured, but is different from the recommended fragment, the system may check out the fragment from the matrix, add the fragment to an interim enlarged multi-fragment page image and recalculate the remaining portion of the capturing trajectory based on a new configuration of captured set of fragments. Subsequently, the next recommended fragment may be different from the one suggested by the system before the user made a capturing error.
4. Wrong fragment detected but not identified. The system may detect a capturing error if there is a reliable determination that a newly captured fragment is not the recommended fragment suggested by the instructions; however, the system may be unable to identify exactly which fragment has been actually captured based on a low resolution comparison. In such a case, the system may switch to a semi-automatic mode, display an error message to the user and ask the user to identify the newly captured fragment on the matrix. Direct pointing to the captured fragment in the matrix display, buttons to provide matrix row/column coordinates and other mechanisms of addressing the segment may be used. In some embodiments, the system may also offer a Delete or Undo/Redo option to negate the most recent capturing step or several steps if the user has decided, for example, to strictly follow system instructions and does not want to add a newly captured wrong segment to the capturing path.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for dynamic multi-segment capturing of content from large documents, surfaces or other objects where the system builds a capturing matrix and merges the captured fragments into an enlarged image, while a user is instructed about success of each capturing step and is driven along a most efficient capturing path.

Figure 1:
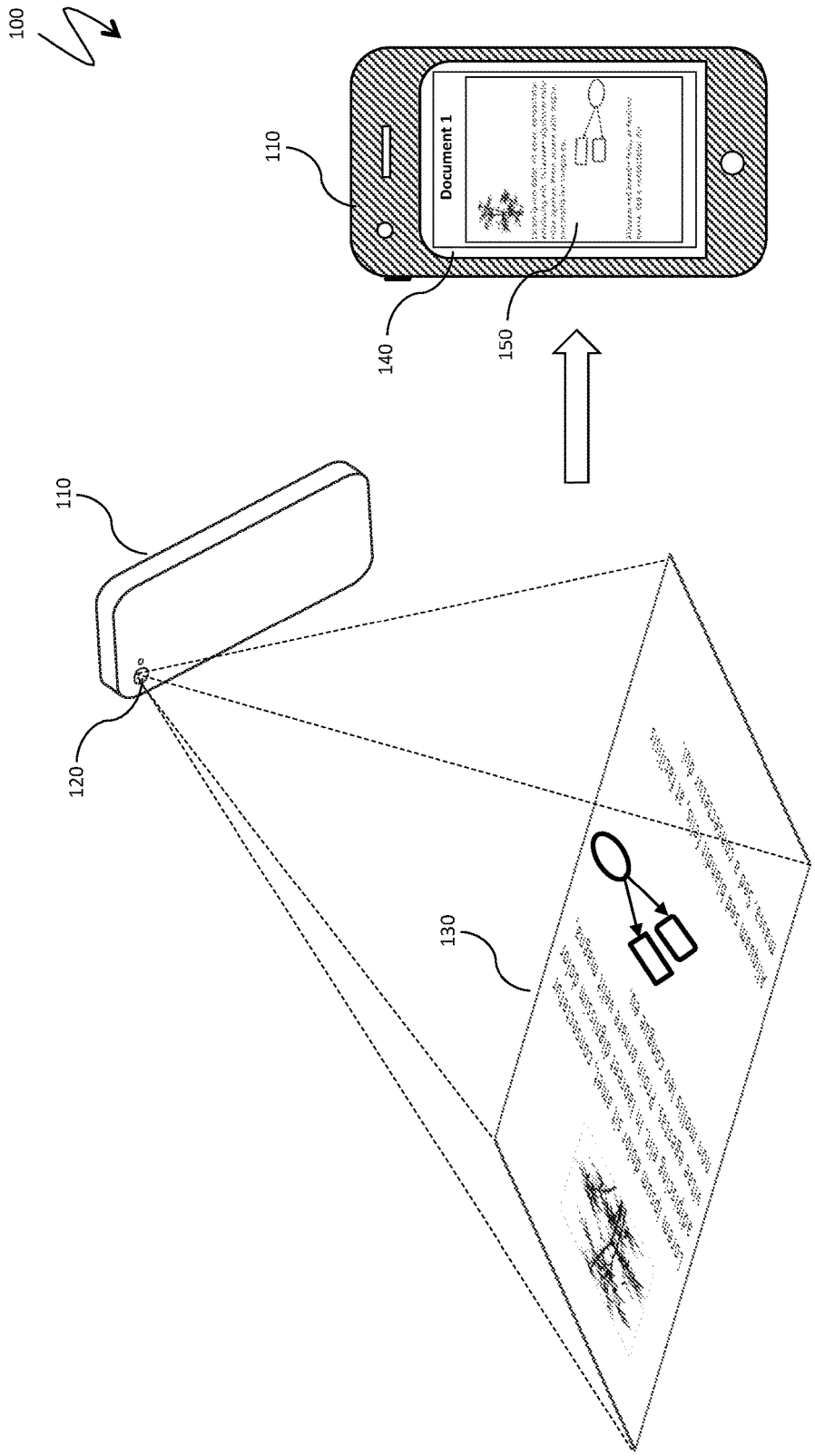
FIG. 1 is a schematic illustration of a full-page photograph, according to an embodiment of the system described herein.

FIG. 1 is a schematic illustration 100 of obtaining a full-page photograph taken prior to matrix capturing, as explained elsewhere herein. A smartphone 110 with an embedded camera 120 takes a full-page photograph of a document page 130 from a sufficient distance and view angle to fit the whole page into the camera view. Alternatively, the camera 120 may take a photograph of a whiteboard or any other drawing surface or another object. Generally, the document page 130 may represent a page from a book or magazine, a printed newspaper article, a receipt, an invoice, a check, a tax form or other form, a printed report, one or more business card, a handwritten note, a memo on a legal pad, a page from a specialized Moleskine notebook, a page from a specialized Moleskine sticky note, an easel, and/or anything that can be captured as an image. A smartphone application 140 may display a full-page image 150, at which time the system may calculate a size of various elements in the image, such as letter height for different fonts used in the document page 130, and determine, based on default or user customized system settings and thresholds, whether the full-page image is sufficiently legible. Note that the assumption for full-featured system functioning is that the original full-page image is insufficient for user purposes.

Figure 2:
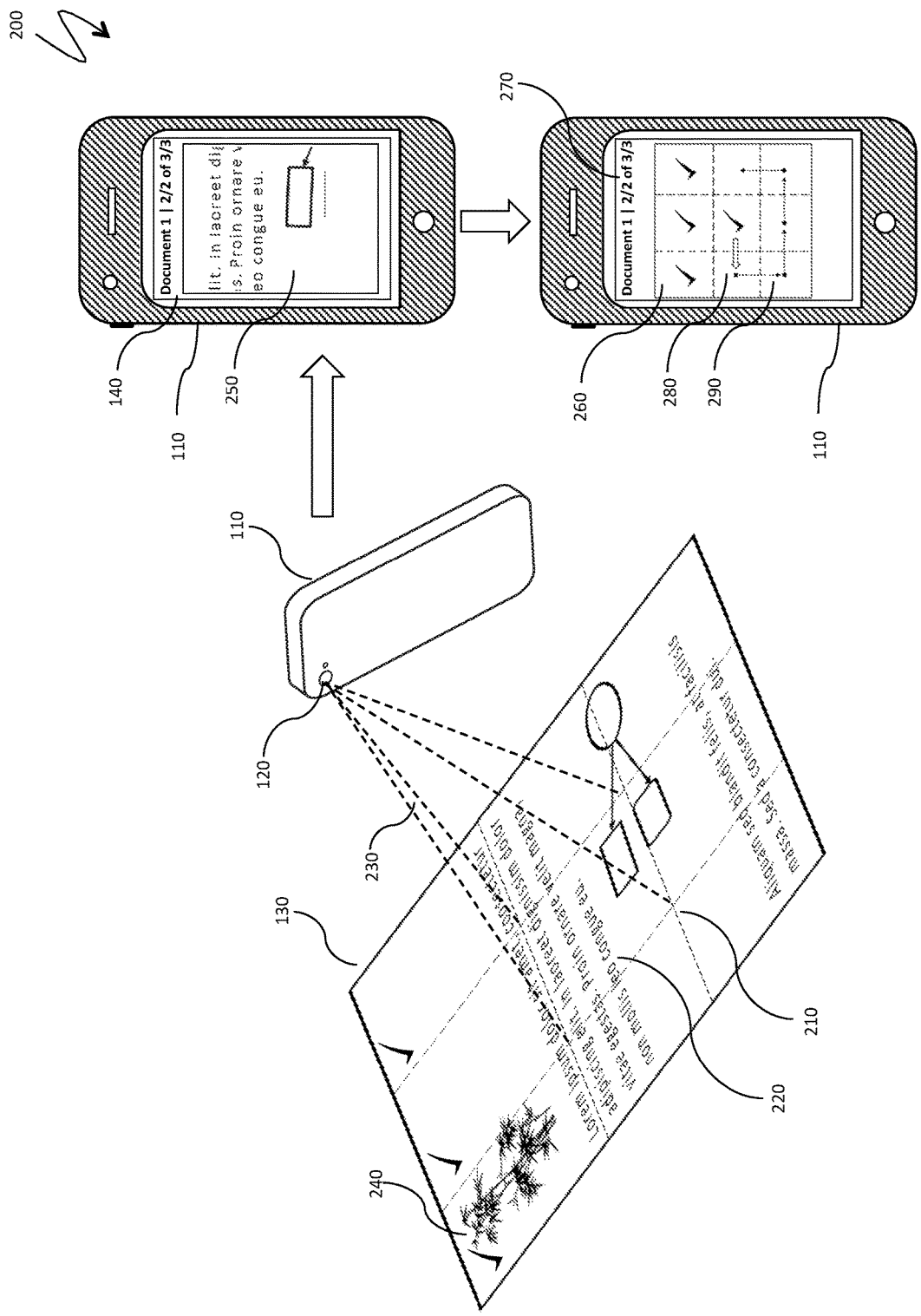
FIG. 2 is a schematic illustration of matrix capturing, according to an embodiment of the system described herein.

FIG. 2 is a schematic illustration 200 of a matrix capturing step. A matrix grid 210 shown on the document 130 has been built by the system; however, the matrix grid 210 is shown on the document 130 only for the illustration purpose, while actually the matrix grid 210 may be visible in the camera preview window, as explained elsewhere herein. A user captures a fragment (matrix cell) 220 by adjusting a distance of the camera 120 and a view angle 230 of the camera 120 embedded in the smartphone 110 so that the fragment 220 fills the preview window of the camera 120 (which may be part of the standard smartphone camera functioning or an adapted/customized view in the dedicated smartphone application 140). Previously captured fragments 240 are indicated on the document 130 by checkmarks, also for the illustration purpose as the camera may not project any image on an original physical document, but rather synthesize additional images on the screen of the smartphone 110.

After the fragment 220 has been captured, the system may display the fragment 220 as an image 250 in the application 140. FIG. 2 illustrates a scenario where the fragment 220 has been captured in accordance with system recommendations and the image 250 has a sufficient quality so that the system may subsequently display on the screen of the smartphone 110 a capturing matrix 260 with information 270 for a recently captured fragment. The fragment 220 may be shown with a checkmark and a next fragment recommended for capturing may be indicated by a bold arrow 280, while a remaining portion of the capturing process may be shown by a dashed trajectory 290. Note that in FIG. 2 the depiction of the smartphone application window 140 is schematic and does not show all user interface elements, which are shown on enlarged smartphone images and are explained in more detail in FIG. 3.

Figure 3:
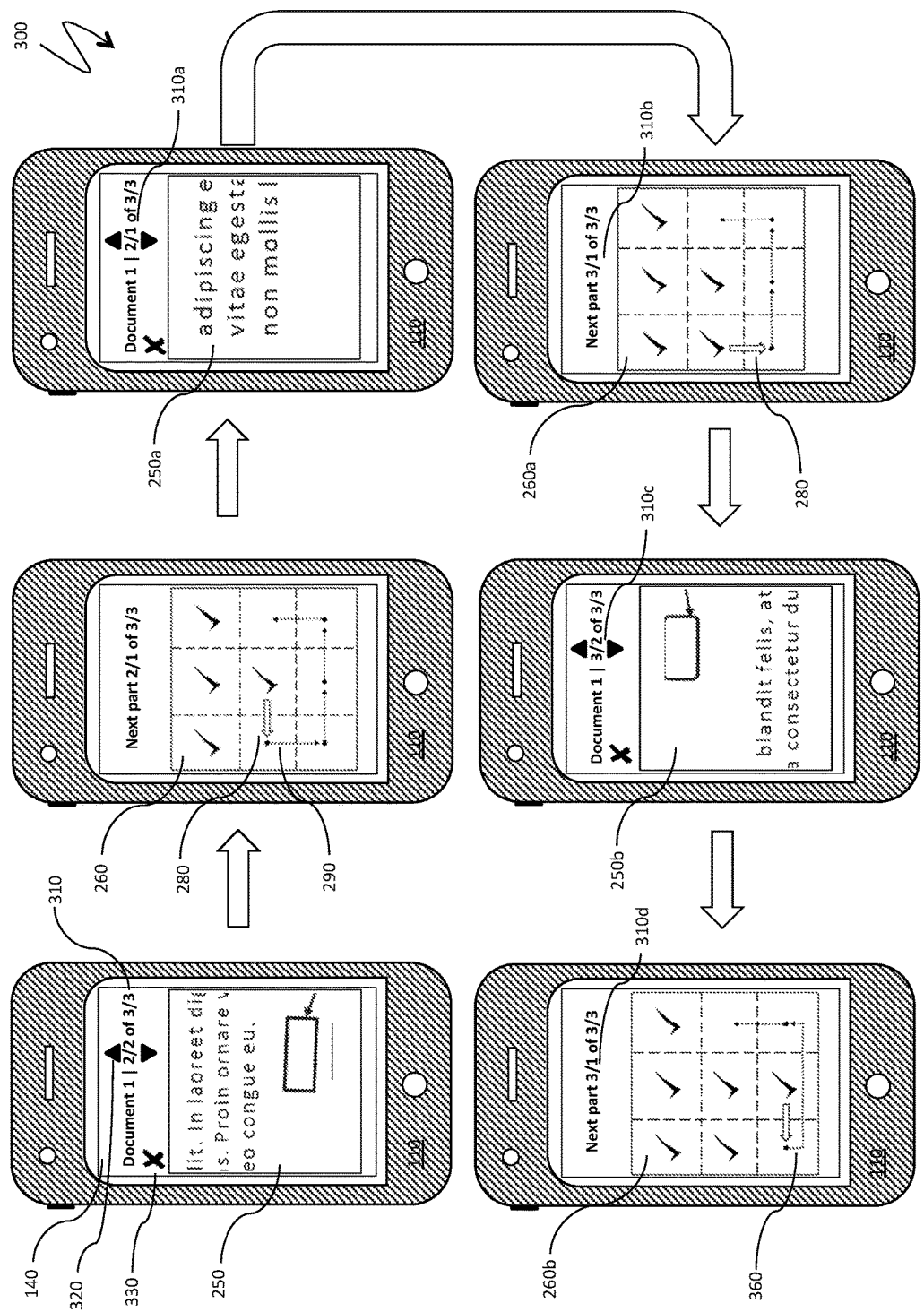
FIG. 3 is a schematic illustration of a sequence for capturing page fragments followed by matrix navigation instructions displayed by the system, according to an embodiment of the system described herein.

FIG. 3 is a schematic illustration 300 of a sequence of steps where capturing of page fragments is followed by matrix navigation instructions displayed by the system. At a first step, the smartphone application 140, implementing system functioning on a user smartphone, is used to capture the image 250 corresponding to a central fragment of the matrix (the cell (2,2) in the 3×3 matrix) corresponding to the fragment 220 in FIG. 2. An identifier of the current fragment (in FIG. 3, 2/2 of 3/3) is presented in a header 310 of the display provided by the application 140 on the smartphone 110, which also shows the image 250.

A user interface of the application 140 may have several tools for process control. A pair of buttons 320 (up/down scrolling of fragment identifier) may be used to manually indicate fragment location in case the user made an error and has taken a photograph of a different fragment than a recommended fragment, as explained elsewhere herein. For example, pressing an upper button of the buttons 320 may display a fragment identifier 2/3, the next fragment to the right of the originally displayed fragment 2/2, while pressing a lower of the buttons 320 may show a fragment identifier 2/1, a fragment to the left of the displayed fragment. Alternatively, the user may directly click on the capturing matrix 260 to point to a particular cell. A deletion button 330 may allow a user to instantly exclude a current fragment being displayed by the application 140, possibly because the user had obstructed the fragment with other objects, does not want to use a captured fragment different from the system navigation recommendations, or for other reasons.

At a second step of the sequence, the capturing matrix 260 is displayed in a current state of the capturing matrix 260 where the bold arrow 280 indicates a next recommended fragment for capturing and the dashed trajectory 290 shows the rest of recommended navigation path across non-captured segments. At the next step, the user captures a recommended segment and receives a new image 250a corresponding to the recommended next segment and a notification 310a; the image 250a is then added by the system to a synthesized enlarged image of the page. The system continues tracing of non-captured fragments and displays to the user a current status 260a of the capturing matrix 260 and process where a next recommended fragment is indicated by the bold arrow 280 and is indicated in a heading 310b.

The user, however, makes an error and instead of the requested fragment (3, 1), the left most fragment in the bottom row 3 of the matrix, captures the middle fragment (3, 2) of the row 3, resulting in an image 250b. Several choices are available for the system and user to accommodate the error, as explained elsewhere herein. The system may automatically identify which fragment has been actually captured; or the user may manually indicate the captured fragment using the buttons 320, which is shown in a heading 310c. The user may delete the captured fragment to follow system instructions. However, if the image 250b has a sufficient quality, there may be no obvious reason for discarding the segment, as long as the segment is correctly identified within the capturing matrix. If the segment is retained, the system recalculates a remaining capturing path 360 starting from the just captured fragment and displays the capturing path 360 on a revised status matrix 260b, additionally indicating the next segment in a heading 310d.

Figure 4:
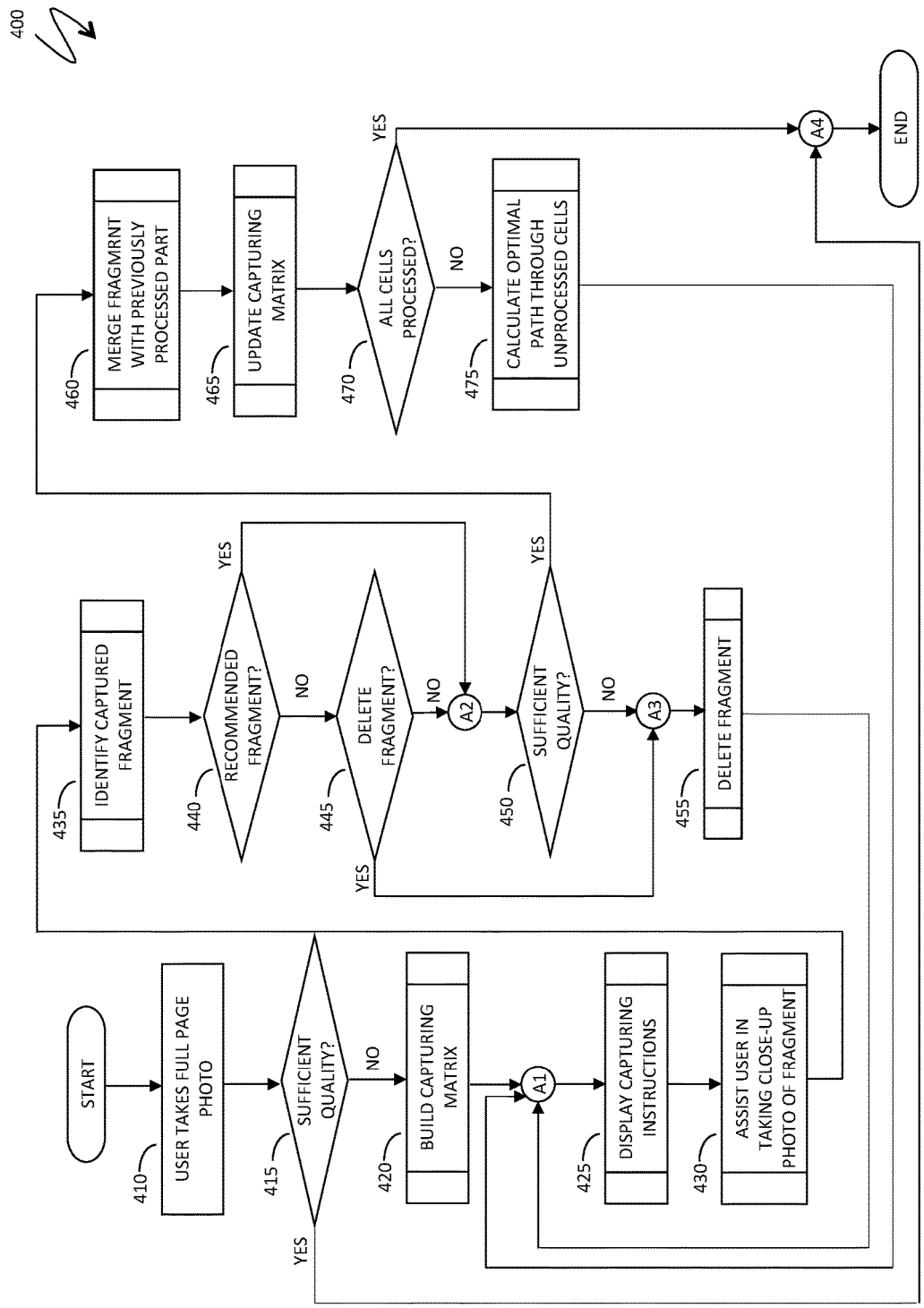
FIG. 4 is a system flow diagram illustrating matrix capturing an image in connection with system functioning, according to an embodiment of the system described herein.

Referring to FIG. 4, a system flow diagram 400 illustrates processing in connection with matrix scanning of large documents. Processing begins at a step 410 where a user takes a full page photograph of the document or other surface/object. After the step 410, processing proceeds to a test step 415, where it is determined whether the image has a sufficient quality to avoid matrix capturing. If so, processing is complete and there is no need for matrix capturing; otherwise, processing proceeds to a step 420, where the system builds a document for subsequent matrix capturing, as explained in more detail elsewhere herein. After the step 420, processing proceeds to a step 425, where the system displays a current state of a capturing matrix with the capturing instructions to the user, as explained elsewhere herein. After the step 425, processing proceeds to a step 430 where the system assists the user in taking a close-up photograph of a current fragment of the document.

After the step 430, processing proceeds to a step 435, where the system attempts to identify the captured fragment using by comparing an analogous fragment of the original full-page photograph, as explained elsewhere herein. After the step 435, processing proceeds to a test step 440 where it is determined whether the identified fragment (by the system or/and the user) is the same fragment that was recommended by the system at the step 425. If not, processing proceeds to a test step 445, where it is determined whether the captured fragment should be deleted according to either an explicit user request or to system rules (e.g., the fragment cannot be identified). If so, processing proceeds to a step 455 where the fragment is deleted and control is transferred back to the step 425 without changing the capturing matrix status or the system recommendations to the user. Otherwise, processing proceeds to a test step 450 (which can be independently reached from the step 440 in case the captured fragment is the same as the recommended fragment), where it is determined whether the currently captured image has the sufficient quality. If not, processing proceeds to the previously described step 455 for deletion. Otherwise, processing proceeds to a step 460, where the system merges the newly captured fragment image with the previously processed fragments. After the step 460, processing proceeds to a step 465, where the system updates the capturing matrix by checking off the newly captured fragment. After the step 465, processing proceeds to a test step 470 where it is determined whether all matrix cells have already been processed, that is, whether all fragments of the page have been captured and added to the enlarged full image of the page, as explained elsewhere herein. If so, processing is complete; otherwise, processing proceeds to a step 475 where the system calculates an optimal capturing path through the updated set of uncaptured cells. After the step 475, processing proceeds back to the step 425 for another iteration.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The smartphone may include software that is pre-loaded with the device, installed from an app store, installed from a desktop (after possibly being pre-loaded thereon), installed from media such as a CD, DVD, etc., and/or downloaded from a Web site. The smartphone may use an operating system selected from the group consisting of: iOS, Android OS, Windows Phone OS, Blackberry OS and mobile versions of Linux OS. The smartphone may be connected by various types of wireless and other connections, such as cellular connections in Wide Area Networks, Wi-Fi, Bluetooth, NFC, USB, infrared, ultrasound and other types of connections. A mobile device other than a smartphone may be used. Note that the system described herein may be used with any device capable of taking a photograph and providing appropriate feedback to a user, such as a digital camera with a screen for providing messages to the user and a mechanism for providing an intermediate image stream.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of enhancing image quality of an initial full image of a document, comprising:
   subdividing the initial full image of the document into a number of segments;
   directing a user to take photographs with a smartphone to provide a separate segment image for each of the segments by presenting on a screen of the smartphone a view of the document having lines superimposed thereon corresponding to the segments; and
   merging the separate segment images to provide an enhanced full image.

2. A method, according to claim 1, wherein the number of segments depends upon a size of text in the initial full image and a desired height of text in the enhanced full image.

3. A method, according to claim 1, wherein the document is one of: a page from a book, a page from a magazine, a printed newspaper article, a receipt, an invoice, a check, a tax form or other form, a printed report, one or more business cards, a handwritten note, a memo on a legal pad, a page from a specialized Moleskine® notebook, a specialized Moleskine® sticky note, and an easel.

4. A method, according to claim 1, wherein the initial full image is provided by a photograph taken by the user with the smartphone.

5. A method, according to claim 1, wherein the view of the document having lines superimposed thereon corresponding to the segments provides a target to the user for photographing the segments.

6. A method, according to claim 1, wherein, in response to the user successfully photographing a particular segment, a visual indicator is provided on the particular segment in the view of the document having lines superimposed thereon corresponding to the segments.

7. A method, according to claim 1, wherein instructions for photographing non-captured segments are provided to the user on the screen of the smartphone.

8. A method, according to claim 7, wherein the instructions include an arrow indicating a recommended next one of the segments to photograph and a recommended navigation path across non-captured segments.

9. A method, according to claim 8, wherein in response to a user photographing a particular segment that is not the recommended next one of the segments, the navigation path is adjusted.

10. A method, according to claim 8, wherein in response to a user photographing a particular segment that is not the recommended next one of the segments, the user is provided with an option to delete the segment image corresponding to the particular segment.

11. A method, according to claim 8, wherein in response to a user photographing a particular segment that is not the recommended next one of the segments, the user is provided with an option to indicate that the corresponding segment image is for a different segment in the view of the document having lines superimposed thereon corresponding to the segments.

12. A method, according to claim 1, wherein the smartphone automatically detects which of the segments has been photographed by the user.

13. A method, according to claim 1, wherein a captured image is automatically deleted in response to a quality of the image being relatively low.

14. A method, according to claim 1, wherein a user is provided with an option to delete an image in response to obstructions being detected in the image.

15. A method, according to claim 1, wherein the smartphone includes at least one of: software that is pre-loaded with the smartphone, software that is installed from an app store, software that is installed from a desktop, software that is installed from media, and software that is downloaded from a Web site.

16. A method, according to claim 1, wherein the smartphone uses an operating system selected from the group consisting of: iOS, Android OS, Windows Phone OS, Blackberry OS and mobile versions of Linux OS.

17. A non-transitory computer-readable medium containing software that enhances image quality of an initial full image of a document, the software comprising:
   executable code that subdivides the initial full image of the document into a number of segments;
   executable code that directs a user to take photographs with a smartphone to provide a separate segment image for each of the segments by presenting on a screen of the smartphone a view of the document having lines superimposed thereon corresponding to the segments; and
   executable code that merges the separate segment images to provide an enhanced full image.

18. A non-transitory computer-readable medium, according to claim 17, wherein the number of segments depends upon a size of text in the initial full image and a desired height of text in the enhanced full image.

19. A non-transitory computer-readable medium, according to claim 17, wherein the document is one of: a page from a book, a page from a magazine, a printed newspaper article, a receipt, an invoice, a check, a tax form or other form, a printed report, one or more business cards, a handwritten note, a memo on a legal pad, a page from a specialized Moleskine® notebook, a specialized Moleskine® sticky note, and an easel.

20. A non-transitory computer-readable medium, according to claim 17, wherein the initial full image is provided by a photograph taken by the user with the smartphone.

21. A non-transitory computer-readable medium, according to claim 17, wherein the view of the document having lines superimposed thereon corresponding to the segments provides a target to the user for photographing the segments.

22. A non-transitory computer-readable medium, according to claim 17, wherein, in response to the user successfully photographing a particular segment, a visual indicator is provided on the particular segment in the view of the document having lines superimposed thereon corresponding to the segments.

23. A non-transitory computer-readable medium, according to claim 17, wherein instructions for photographing non-captured segments are provided to the user on the screen of the smartphone.

24. A non-transitory computer-readable medium, according to claim 23, wherein the instructions include an arrow indicating a recommended next one of the segments to photograph and a recommended navigation path across non-captured segments.

25. A non-transitory computer-readable medium, according to claim 24, wherein in response to a user photographing a particular segment that is not the recommended next one of the segments, the navigation path is adjusted.

26. A non-transitory computer-readable medium, according to claim 24, wherein in response to a user photographing a particular segment that is not the recommended next one of the segments, the user is provided with an option to delete the segment image corresponding to the particular segment.

27. A non-transitory computer-readable medium, according to claim 24, wherein in response to a user photographing a particular segment that is not the recommended next one of the segments, the user is provided with an option to indicate that the corresponding segment image is for a different segment in the view of the document having lines superimposed thereon corresponding to the segments.

28. A non-transitory computer-readable medium, according to claim 17, wherein the smartphone automatically detects which of the segments has been photographed by the user.

29. A non-transitory computer-readable medium, according to claim 17, wherein a captured image is automatically deleted in response to a quality of the image being relatively low.

30. A non-transitory computer-readable medium, according to claim 17, wherein a user is provided with an option to delete an image in response to obstructions being detected in the image.

31. A non-transitory computer-readable medium, according to claim 17, wherein the smartphone includes at least one of: software that is pre-loaded with the smartphone, software that is installed from an app store, software that is installed from a desktop, software that is installed from media, and software that is downloaded from a Web site.

32. A non-transitory computer-readable medium, according to claim 17, wherein the smartphone uses an operating system selected from the group consisting of: iOS, Android OS, Windows Phone OS, Blackberry OS and mobile versions of Linux OS.

* * * * *